July 13, 1971  E. K. JONES  3,592,872
PROCESS FOR THE REGENERATION OF A USED SULFURIC
ACID ALKYLATION CATALYST
Filed March 3, 1969
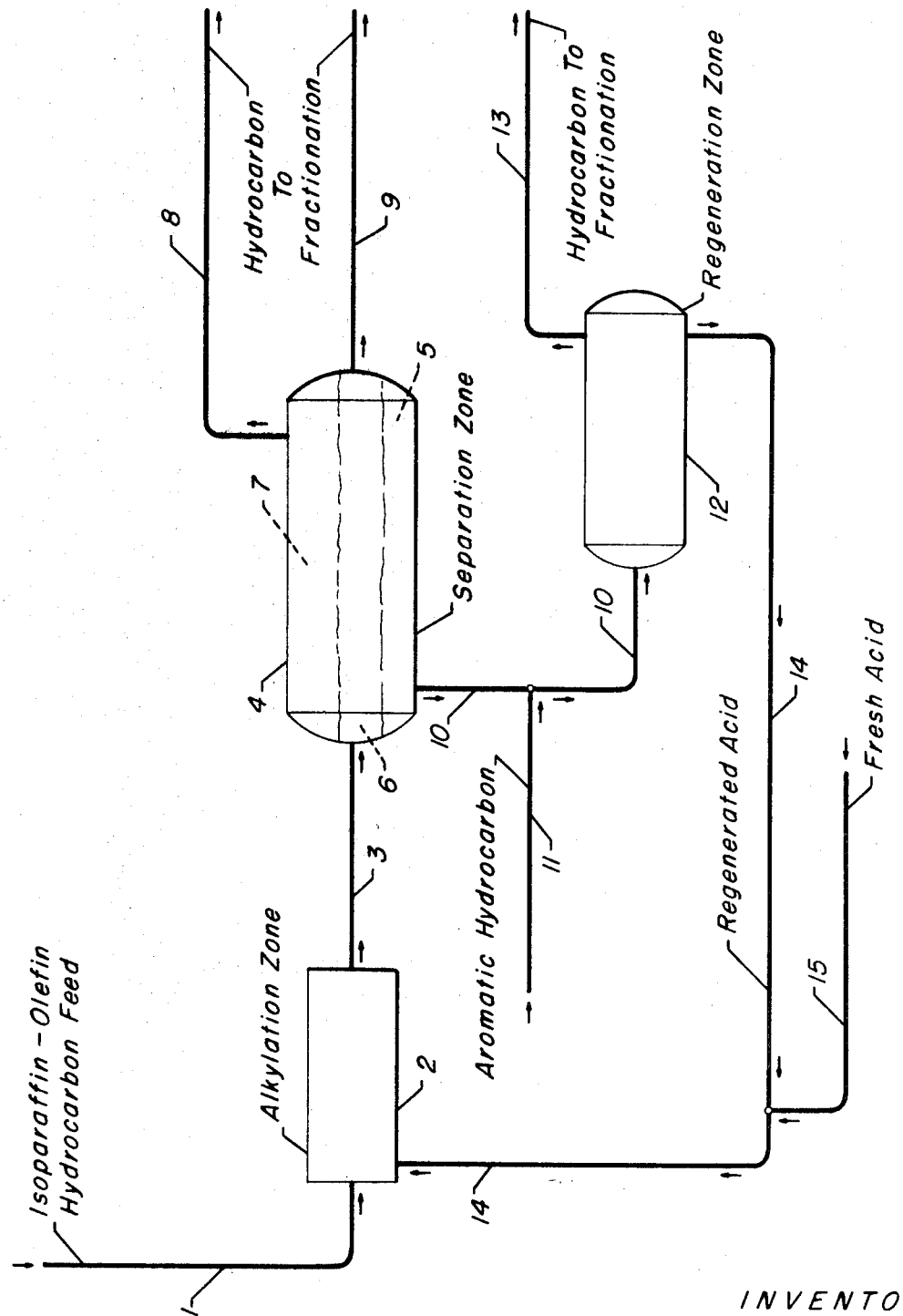
INVENTOR:
Edwin K. Jones
BY:
James R. Hoatson, Jr.
Philip T. Liggett
ATTORNEYS United States Patent Office 3,592,872
Patented July 13, 1971

3,592,872
PROCESS FOR THE REGENERATION OF A USED SULFURIC ACID ALKYLATION CATALYST
Edwin K. Jones, Kenilworth, Ill., assignor to Universal Oil Products Company, Des Plaines, Ill.
Filed Mar. 3, 1969, Ser. No. 803,540
Int. Cl. C07c 3/54
U.S. Cl. 208—683.62                    7 Claims

ABSTRACT OF THE DISCLOSURE

A sulfuric acid alkylation catalyst is regenerated by a continuous in-situ process utilizing steps including separation and the subsequent selective reaction of an aromatic compound with the olefinic hydrocarbon portion of a sulfuric acid-olefinic hydrocarbon mixture at temperatures below about 72° F.

BACKGROUND OF THE INVENTION

This invention relates to a regeneration process. It particularly relates to a process for regenerating a sulfuric acid alkylation catalyst. This specifically relates to a continuous in-situ process for the regeneration of a spent sulfuric acid alkylation catalyst.

It is well known in the prior art that catalytic alkylation utilizing sulfuric acid as the catalyst is an important chemical tool for preparing alkylated hydrocarbons and derivatives thereof. The commercial and industrial demand for these products is exemplified by the demand for isoparaffin hydrocarbons and alkyl substituted benzenes of the gasoline boiling range and with the demand for alkyl substituted aromatics suitable for conversion to surfactants, e.g., detergents, wetting agents, and the like.

This invention is especially applicable in the regeneration of a sulfuric acid catalyst from a catalytic alkylation unit. In such processes, there is a need for periodic regeneration of the catalyst system inasmuch as the catalyst becomes spent. This is usually accomplished in prior art schemes by taking a stream of at least a portion of the liquid catalyst and burning the olefinic polymer sulfuric acid mixture for the production of new acid. A problem with such prior art regeneration schemes is that the regeneration facilities are usually remote from the alkylation unit itself. Further, such prior art processes for regenerating a liquid catalyst usually involve schemes which present problems both from a process standpoint and from an apparatus standpoint. For example, severe corrosion problems in the regeneration equipment that would normally be utilized in a typical regeneration scheme usually arise.

SUMMARY OF THE INVENTION

Accordingly, it is an object of the present invention to provide a process for regenerating a sulfuric acid alkylation catalyst.

It is a specific object of this invention to provide a continuous in situ process for the regeneration of a spent sulfuric acid alkylation catalyst in a more facile and economical manner.

It is another specific object of this invention to provide valuable by-products such as desired alkylbenzenes which are useful as detergent alkylates or can be charged to chemical processes for the production of other valuable products and, further, to keep the alkylation reaction from generating additional contaminants by the elimination of the contaminating agent in the spent sulfuric acid catalyst.

Therefore, the present invention provides a continuous in situ process for the regeneration of a sulfuric acid alkylation catalyst which comprises the steps of: (a) withdrawing from an alkylation reaction zone an alkylation reaction zone effluent comprising a sulfuric acid-olefinic hydrocarbon mixture, gaseous hydrocarbon, and liquid hydrocarbon; (b) introducing said alkylation reaction zone effluent into a separation zone wherein said effluent is separated into a sulfuric acid-olefinic hydrocarbon portion, a liquid hydrocarbon portion, and a gaseous hydrocarbon portion; (c) passing said sulphuric acid-olefinic hydrocarbon portion of said effluent in admixture with an aromatic compound to a regeneration zone maintained at regeneration conditions wherein said aromatic compound selectively reacts with the olefinic hydrocarbon to form an alkyl aromatic hydrocarbon; (d) passing said liquid and gaseous hydrocarbon portions of Step (b) and the alkyl aromatic hydrocarbon of Step (c) to a fractionation zone; and, (e) recovering a substantially olefinic hydrocarbon-free sulfuric acid suitable for recycle to said alkylation reaction zone.

As will be described hereinafter in greater detail, the essence of my invention encompasses the regeneration of a sulfuric acid alkylation catalyst by contacting a sulfuric acid-olefinic hydrocarbon mixture with an aromatic compound at contacting conditions including a temperature below about 72° F. so that the aromatic compound selectively reacts with at least a portion of the olefinic hydrocarbon (which usually comprises primary and polycyclic olefins) to form alkyl aromatic compounds, and a substantially olefinic hydrocarbon-free sulfuric acid is recovered for subsequent reuse.

The description of my invention shall be limited to a processing scheme for handling the effluent from a sulfuric acid alkylation catalyst process reaction zone although the scope of the invention is not necessarily limited thereto. The effluent is prepared by means well known to those skilled in the art and generally comprises the passing of an isoparaffin hydrocarbon feedstock reactant with an olefinic feedstock reactant to a conventional catalytic alkylation reaction zone, wherein a liquid catalyst such as sulfuric acid is intimately contacted by the reactants. At the end of the desired residence time in the catalytic alkylation process reaction zone, the total effluent from the reaction zone is generally removed and passed into separation means including flashing means, fractionation means, and the like, in order to obtain the desired products of the catalytic alkylation. My process is concerned with the alkylation reaction zone effluent as soon as the effluent leaves the reaction zone.

My invention can be most clearly described and illustrated with reference to the attached drawing which is a schematic representation of a specific embodiment of this invention.

DESCRIPTION OF THE DRAWING

Referring now to the drawing, an isoparaffin-olefin hydrocarbon feed passes via line 1 into a conventional catalytic alkylation reaction zone wherein a liquid catalyst such as sulfuric acid is passed via lines 15 and 14 into alkylation zone 2 wherein the liquid catalyst intimately contacts the isoparaffin-olefin hydrocarbon feed reactants. At the end of the desired residence time in the catalytic alkylation process reaction zone, the total effluent from the reaction zone is withdrawn and passed as feed into separation zone 4. It is preferred that the effluent which comprises a sulfuric acid-olefinic hydrocarbon mixture, gaseous hydrocarbon, and liquid hydrocarbon feed is charged, either before or after flashing means (not shown), to a middle portion of the separation zone which may contain trays, baffles, heating means, cooling means, and the like.

In separation zone 4, the akylation reaction zone effluent is separated into a sulfuric acid-olefinic hydrocarbon portion represented by numeral 5, a liquid hydrocarbon portion represented by numeral 6, and a gaseous hydrocarbon portion represented by numeral 7. The sulfuric acid-olefinic hydrocarbon portion of the effluent (numeral 5) is passed via line 10 to a commingling step with aromatic compound, preferably aromatic hydrocarbon via line 11. The resultant sulfuric acid-olefinic hydrocarbon-aromatic compound almixture is then passed to regeneration zone 12 which is maintained at regeneration conditions including a temperature below about 72° F., and preferably a temperature in the range of from about 0° F. to about 70° F.

Preferred aromatic compounds for use according to the process of my invention include benzene, toluene, the xylenes, and the various higher molecular weight alkyl aromatic hydrocarbons such as ethylbenzenes, ortho-ethyltoluene, meta-ethyltoluene, the propylbenzenes, the hexylbenzenes, and various mixtures thereof. It is also contemplated within the scope of my invention that reformates produced by the reforming of a petroleum feed comprising a saturated gasoline fraction which may include straight-run gasoline, natural gasoline, etc., and which is usually referred to as naphtha having an initial boiling point of about 150° F. to about 250° F. and an end boiling point within the range of from about 350° F. to about 425° F. may also be utilized for the aromatic content of the reformate within the scope of my invention. Of the preferred aromatic compounds, the aromatic hydrocarbons are preferred, and of the preferred aromatic hydrocarbons, benzene and toluene are especially prefered for use in my invention.

As set forth hereinabove, the aromatic compound is admixed and contacted with the sulfuric acid-olefinic hydrocarbon mixture in regeneration zone 12 at temperature below about 72° F. and, it is preferred that the mole ratio of aromatic compound to sulfuric acid-olefinic hydrocarbon mixture be kept in the range of from about 0.1:1 to about 15:1, and preferably in the range of from about 0.2:1 to about 1:1. It is necessary within the scope of my invention that the regeneration temperature be kept below about 72° F., and preferably in the range of from about 0° F. to about 70° F., in order to keep the acid portion of the mixture to be regenerated from absorbing the aromatic compound.

The resultant alkyl aromatic hydrocarbon formed by the reaction of the olefinic portion of the sulfuric acid mixture with the aromatic compound passes from regeneration zone 12 via line 13 to fractionation for subsequent recovery for the valuable by-products produced. The liquid and gaseous hydrocarbon portions separated in separation zone 4 are removed via lines 8 and 9 respectively, and also passed into a fractionation zone. The substantially olefinic hydrocarbon-free sulfuric acid, suitable for recycle to the alkylation zone is passed via line 14 from regeneration zone 12 and fresh acid via line 15 is commingled with the regenerated acid prior to passage thereof to alkylation zone 2. It is noted that the liquid hydrocarbon portion represented by the numeral 6 and passing to fractionation via line 9 usually passes to a deisobutanizing portion of the fractionation train. The gaseous hydrocarbon portion represented by the numeral 7 passing from separation zone 4 via line 8 usually contains propane and isobutane and is usually passed to a depropanizing section of a fractionation zone.

PREFERRED EMBODIMENT

In a particularly preferred embodiment of this invention, this invention provides a continuous in-situ process for the regeneration of a sulfuric acid alkylation catalyst which comprises the steps of: (a) withdrawing from an alkylation reaction zone an alkylation reaction zone effluent comprising a sulfuric acid-olefinic hydrocarbon mixture, gaseous hydrocarbon and liquid hydrocarbon; (b) introducing said alkylation reaction zone effluent into a separation zone wherein said effluent is separated into a sulfuric acid-olefinic hydrocarbon portion, a liquid hydrocarbon portion, and a gaseous hydrocarbon portion; (c) passing said sulfuric acid-olefinic hydrocarbon portion of said effluent in admixture with benzene to a regeneration zone maintained at regeneration conditions including a temperature below about 72° F. and a benzene to sulfuric acid-olefinic hydrocarbon mixture mole ratio of from about 0.1:1 to about 15:1 wherein the benzene selectively reacts with the olefinic hydrocarbon to form an alkyl benzene hydrocarbon; (d) passing said liquid and gaseous hydrocarbon portions of Step (b) and the alkylbenzene hydrocarbon of Step (c) to a fractionation zone; and, (e) recovering a substantially olefinic hydrocarbon-free sulfuric acid suitable for recycle to said alkylation reaction zone.

Thus, it is apparent that the present invention provides a process for the regeneration of a sulfuric acid alkylation catalyst, utilizing a minimum of processing steps and a minimum of regeneration apparatus to accomplish the regeneration in a most simple, economical and efficient manner. Further, the subsequent separation and recovery of the alkyl aromatic hydrocarbons produced by the selective reaction of the aromatic compound with the olefinic hydrocarbon portion of the spent sulfuric acid mixture results in the obtaining of valuable alkylaromatic compounds which, as mentioned before, have great use as detergent type alkylates, etc.

I claim as my invention:

1. A continuous in-situ process for the regeneration of sulfuric acid alkylation catalyst which comprises the steps of:
   (a) withdrawing from an alkylation reaction zone an alkylation reaction zone effluent comprising a sulfuric acid-olefinic hydrocarbon mixture, gaseous hydrocarbon, and liquid hydrocarbon;
   (b) introducing said alkylation reaction zone effluent into a separation zone wherein said effluent is separated into a sulfuric acid-olefinic hydrocarbon portion, a liquid hydrocarbon portion comprising alkylate, and a gaseous hydrocarbon portion;
   (c) passing said sulfuric acid-olefinic hydrocarbon portion of said effluent in admixture with an aromatic compound to a regeneration zone maintained at a temperature of from about 0° F. to about 70° F. wherein said aromatic compound selectively reacts with the olefinic hydrocarbon to form an alkyl aromatic hydrocarbon;
   (d) passing said liquid and gaseous hydrocarbon portions of Step (b) and the alkyl aromatic hydrocarbon of Step (c) to a fractionation zone; and,
   (e) recovering a substantially olefinic hydrocarbon-free sulfuric acid and recycling the same to said alkylation reaction zone.

2. The process according to claim 1 wherein said aromatic compound is benzene.

3. The process according to claim 1 wherein said aromatic compound is toluene.

4. The process according to claim 1 wherein said aromatic compound is a reformate containing an aromatic hydrocarbon.

5. The process according to claim 1 wherein the mole ratio of aromatic compound to sulfuric acid-olefinic hydrocarbon mixture in Step (c) is from about 0.1:1 to 15:1.

6. The process according to claim 1 wherein said alkyl aromatic hydrocarbon is separately recovered from said fractionation zone.

7. The process according to claim 1 wherein said substantially olefinic hydrocarbon-free sulfuric acid is recycled to said alkylation zone in admixture with fresh sulfuric acid.

References Cited

UNITED STATES PATENTS

| | | | |
|---|---|---|---|
| 2,393,895 | 1/1946 | Fleming | 260—683.62 |
| 2,395,775 | 2/1946 | Anderson et al. | 260—683.62 |
| 2,582,047 | 1/1952 | Lee | 260—683.62 |

DELBERT E. GANTZ, Primary Examiner

G. J. CRASANAKIS, Assistant Examiner

U.S. Cl. X.R.

260—703